United States Patent Office 3,136,725
Patented June 9, 1964

3,136,725
CALCIUM ALKENYL SUCCINATE GREASE MAKING
John W. Nelson, Lansing, Ill., assignor, by mesne assignments, to Sinclair Research Inc., New York, N.Y., a corporation of Delaware
No Drawing. Filed Sept. 18, 1958, Ser. No. 761,699
12 Claims. (Cl. 252—39)

This invention is drawn to a novel method for making lubricating greases which contain as the essential thickening constituent a calcium soap made from an alkenyl substituted succinic acid component.

Many commercial greases use the lithium or calcium soap of hydrogenated castor oil or 12-hydroxy stearic acid as the essential thickening ingredient. The starting organic materials for these greases are expensive and may become in short supply. Alkenyl succinic anhydrides cost about one-half as much as these materials and are made by treating a mono-olefin with maleic anhydride, both of which are derived in plentiful supply from petroleum. U.S. Patent 2,528,373 reports the preparation of greases containing various alkenyl succinate soaps. Useable materials, however, were reported in this patent to be confined to the magnesium, aluminum and beryllium soaps.

My copending application, Serial No. 731,093, filed April 28, 1958, now Patent No. 3,076,763, provides a method for making lubricating greases, comparable in their properties to those made from naturally occurring fats and fatty acids, from alkenyl succinic acids, which utilizes the obvious economic advantages of calcium rather than Mg, Al or Be. The process of the copending application employs an acid component, a calcium component, water, and an oil component. In the process the acid component, mixed with oil and water, is neutralized at room temperature or slightly above with about half the amount of calcium component needed for complete neutralization. Free water is evaporated from this mixture by heating. Then more water, oil, and the remaining stoichiometric amount of calcium component are added to the mixture at room temperature or slightly above until soap formation is complete. The mixture is once more heated to evaporate free water, and is then heated still further, to at least about 300° F. to remove a substantial quantity of combined water. After this, any further oil component needed is added to bring the grease to a soap content of about 2.5 to 50%.

Greases made by this method are characterized by exceptional properties of texture and water stability, high dropping points, low bleed, and valuable extreme pressure qualities. These greases are very thioxtropic, and have an appreciable spread between worked and unworked penetration. They become harder after 100,000 strokes, comparable with greases which have 12-hydroxy stearic acid as the essential soap-forming constituent. As pointed out above, these greases require two calcium addition-water removal operations in order to secure reproducible results.

It has now been discovered that the set of conditions under which the hydrolysis of the alkenyl succinic anhydride is performed affects the final properties of a grease containing calcium alkenyl succinate as the essential thickening constituent. This invention concerns a process by means of which the entire calcium component may be added at one time; that is, without dehydration between two separate additions.

Alkenyl succinic "acids" are manufactured and sold in the anhydride form. The aforementioned U.S. Patent No. 2,528,373 suggests that the anhydride may be converted to the soap without passing through the free acid stage or may be hydrolyzed with water almost at the boiling point of the water. The present invention, however, provides for the hydrolysis in an acid medium of the anhydride, at least to some extent, before neutralization with the alkaline component. It has been found that this mode of hydrolysis affects the final properties of the grease. The hydrolysis may be performed in the presence of part or all of the base oil.

Specifically, the process of the invention comprises the step of mixing an alkenyl succinic anhydride, water and an acid having a dissociation constant of at least $1 \times 10^{-5}$. At least a stoichiometric amount of water must be used; the quantity of water is preferably 25% or more of the weight of the anhydride. The quantity of acid used weighs 0.5–10% as much as the anhydride. When hydrolysis has proceeded at least to some extent, preferably when it is substantially complete, a slurry in water or in oil of the calcium component is added. Before this calcium addition, some or all of the base oil of the grease is added to the hydrolyzate, if no oil, or not enough oil was present during hydrolysis. Agitation is performed on the calcium-oil-hydrolyzate mixture until soap formation is complete. The mixture is then dehydrated and adjusted with any base lubricating oil necessary to give a grease having a soap content of about 2.5 to 50%.

The preparation of the novel greases of the invention involves, in general, the ingredients disclosed in copending application Serial No. 731,093 which disclosure is incorporated herein by reference. The alkenyl substituted succinic anhydride used in forming the calcium soap has between 8 and 39 carbon atoms in the whole molecule, preferably 12–25 carbon atoms, and can be obtained by conventional procedures such as condensing maleic anhydride with an aliphatic olefin having between 4 and 35 carbon atoms. Preferably the olefin is obtained as the bottoms fraction from propylene polymer production, e.g., the propylene tetramer, although it can be derived from various sources including propylene and butylene homo- and hetero-polymers.

The oil component is a liquid oleaginous base material of lubricating viscosity. It may be a mineral lubricating oil fraction of the conventionally refined or solvent refined type. The mineral lubricating oil fraction can be derived from a paraffinic, naphthenic or Mid-Continent crude and is of lubricating viscosity, e.g. from about 50 SUS at 100° F. to 200 SUS at 210° F. In addition, various types of synthetic liquid oleaginous lubricating bases having comparable viscosities, such as the aliphatic dicarboxylic acid esters, e.g., di-(2-ethylhexyl) sebacate, complex esters, formals, etc., can also be employed as part or all of the lubricating base with these particular soaps. Enough of the oil component is used to give a grease containing about 2.5 to 50 percent by weight of soap, preferably about 7.5 to 25 percent, with enough soap being present to give a product of grease consistency including those which harden to grease consistency upon working, for instance, by being pumped through an automatic lubricating system.

The calcium component is a slurry or solution, in water or the oil component, of lime, calcium hydroxide or other at least somewhat water-soluble inorganic calcium compound. An amount of calcium compound is used which is at least sufficient to neutralize essentially all of the acid components. A quantity of water is used in the neutralization which is at least equal in weight to the anhydride. The water may be in excess of this amount and may be as plentiful as economic considerations permit. Better results seem to be obtained when more water is used.

As pointed out above, hydrolysis of the anhydride takes place under acidic conditions. These conditions are brought about by the use of an acid having a dissociation constant greater than about $1 \times 10^{-5}$. Hydrolysis takes a longer time in the presence of weaker acids. Mineral acids such as HCl, $HNO_3$, $H_2SO_4$ and $H_3PO_4$ are effective, as well as organic acids such as paratoluene sulfonic acid or acetic acid. The acid is included in the hydrolysis mixture in a quantity of about 0.5–10%, preferably about 2–5% by weight of the alkenyl succinic anhydride. Hydrolysis may be performed at any temperature above the freezing point of water. For proper reaction speed, temperatures above 150° F. are preferred. No particular advantage has been found in using temperatures above boiling and ordinary grease making equipment is not usually suitable for superatmospheric pressures although they could be employed.

The soap formation preferably is performed in the presence of part or all of the base oil to be used in making the grease, advantageously a quantity weighing at least three times as much as the anhydride. The hydrolysis mixture may also contain acid ingredients, such as about 1 to 15 weight percent based on the succinic anhydride of a fatty acid component, e.g., of 12 to 24 carbon atoms like 12-hydroxy stearic acid or stearic acid which give work stability to the finished grease. Maleic anhydride may also be incorporated in minor amounts to further improve the properties of the greases. Since alkenyl succinic anhydrides are usually insoluble in water while the free acids are soluble in the quantities used in the process and at the preferred hydrolysis temperatures, the completion of hydrolysis, or at least completion to the extent needed to give a final grease of satisfactory properties is evidenced by the production of a clear solution.

The hydrolysis reaction product, including the added acidic component, and a quantity of the base oil amounting to at least three times the weight of the anhydride are then mixed with the slurry of calcium component. Enough calcium component is added to neutralize all of the acid constituents. This mixture is held with stirring at a temperature of up to about 130° F. until all the solid calcium component has substantially disappeared.

The mixture is then raised to a temperature of up to about 250° F. with stirring to remove free water. When bubbles of water vapor no longer come to the surface of the mixture at this temperature, the mixture is heated to between about 300° F. and 450° F. or more, preferably about 310 to 340° F., to remove combined water.

Any quantity of base lubricating oil is added that is needed to give a grease having a soap content of about 2.5 to 50%. The oleaginous liquid lubricating base may all be present at the start of the hydrolysis, or the total quantity can be adjusted after all the steps or during or between any of the steps, so long as a sufficient quantity, as outlined above, is present during the neutralization.

In a preferred procedure, the alkenyl succinic anhydride is charged to a kettle with about 0.5 to 10, preferably about 2 to 5%, based on the weight of the anhydride, of the acid component. They are mixed thoroughly and heated to a temperature of about 150 to 212° F. A quantity of water weighing at least as much as the anhydride is added after the acid component or simultaneously with it. The kettle contents are thoroughly stirred until hydrolysis is essentially complete. A quantity of the base oil weighing 3 or more times the weight of the anhydride is added with stirring. The kettle contents are then cooled to about 90 to 130° F., preferably about 100 to 110° F., and the amount of lime needed to neutralize all of the acid is added as a slurry in water. The mixture is then stirred about 15 minutes. After the disappearance of the stoichiometric amount of solid calcium hydroxide, heat is applied to the kettle to raise the temperature to about 212 to 250° F. over 20 to 40 minutes. When bubble formation ceases, the grease is raised to a temperature of about 330–340° F. for dehydration. The completion of dehydration is shown by a discontinuance of bubble formation in the mass. The grease is preferably held at the dehydration temperature for an additional hour to insure thorough water removal. It is then cooled and the finishing oil is added, with stirring, in proportions required to give the grease grade desired. At this time additives, such as oxidation inhibitors, extreme pressure agents, etc. may be added in minor quantities, perhaps from about 0.6 to 1 percent, to give the grease other desired properties. The grease can be finished by milling at about 130° F. or below in a Charlotte colloid or similar mill.

EXAMPLE I 300 grams tetrapropenyl succinic anhydride, 10 cc. concentrated HCl solution, and 100 cc. of water were heated together in a grease kettle with stirring to 172° F. until the mixture became clear. Then 1200 gms. of oil (conventionally refined mixed naphthenic Mid-Continent oil of 300 SUS at 100° F.) were added and the mixture allowed to cool to 118° F. A 500 cc. water slurry containing 114 grams of calcium hydroxide was added and stirring was continued for about half an hour, after which time no calcium hydroxide was evident. The kettle was gradually heated with agitation to a temperature of about 190° F. and 150 g. of oil were added. It was then heated to 212° F. and from there to 272° F. over about 1 hour. The temperature was then increased gradually to 333° F. and 150 g. more oil added. It was held there for 2 hours. Heating was then discontinued. When the kettle contents had cooled to room temperature by being left overnight, the batch was milled in a Charlotte colloid mill. The grease had an unworked penetration of 309, worked penetration of 359 and after 100,000 strokes on the ASTM worker the penetration was 355.

EXAMPLE II

A grease kettle was charged with 2 pounds of (Monsanto) tetrapropenyl succinic anhydride, 300 cc. water, 30 grams of glacial acetic acid and 45 grams of stearic acid (Armour & Company Neofat 1–65). The mixture was heated to boiling while stirring, and it became clear and homogeneous. Twelve pounds of 300 SUS at 100° F. coastal (naphthenic) oil was then added and the kettle contents were cooled to 100° F. Three hundred fifty-five grams of lime slurried in 1200 cc. water were then added. After 20 minutes, 10 pounds steam pressure was introduced into the kettle jacket. Twenty minutes later a heavy soap had formed and the water was steaming out of the kettle. Two hours later, at 229° F., the gel had darkened and the steam pressure was increased to 25 pounds. During the next two hours the steam pressure was increased gradually to 125 pounds and maintained there for one hour. The temperature of the grease was 341° F. The kettle contents were then cooled to 87° F. and part of the batch was milled at .005 inch clearance in a Charlotte colloid mill to give sample I. Five pounds of the kettle contents were then cut back with 0.7 pound of oil at 200° F. for 30 minutes. It was similarly milled to give sample number II.

Another sample of grease was made using the procedure of Example II but without the inclusion of stearic acid in the saponification mass. Table I reports the properties of this grease (Sample III) as well as Samples I and II which contain a stearic acid component. These properties are also compared with the properties of a calcium alkenyl succinate grease (Sample IV) made according to the process of application Serial No. 731,093 and with a commercial lithium 12-hoydroxy stearate grease.

Table I

| Sample | I | II | III | IV | Lithium 12-hydroxy stearate grease |
|---|---|---|---|---|---|
| Soap, percent (total) [1] | 15.3 | 13.4 | 16.6 | 18.0 | |
| Acetic acid, percent [2] | 3.3 | 3.3 | 3.3 | | |
| Stearic acid, percent [2] | 5.0 | 5.0 | | | |
| Penetrations: | | | | | |
|   Unworked | 199 | 286 | 230 | 292 | 280. |
|   60 strokes | 272 | 347 | 317 | 326 | 280. |
|   100M strokes | 258 | 330 | 296 | 313 | 300. |
| Wheel bearing, 250° F | | Good [3] | | Good | Good. |
| Boiling water test | | Good | | Very good. | Good. |
| Dropping point, ° F | | 500+ | | 500+ | 375. |
| Moisture, percent | 0.4 | 0.4 | 0.5 | Trace | 0.1. |

[1] Includes the acetic and stearic acids.
[2] Based on weight of anhydride.
[3] 0.5 g. leak.

It can readily be seen that the process of this invention provides a grease which exploits low-priced and readily available materials and which is comparable or better in its properties to a commercial lithium 12-hydroxy stearate grease. The process is direct and capable of use with ordinary grease-making equipment.

I claim:

1. A process for making grease containing a liquid oleaginous lubricating base and about 2.5 to 50% of a calcium alkenyl succinate as the essential thickening constituent which comprises neutralizing a hydrolyzed anhydride mixture at a temperature of up to about 130° F. by addition of a calcium component in the presence of an amount of water at least about equal to the weight of the anhydride and a quantity of oleaginous lubricating base at least about three times the weight of the anhydride, removing free water from the mixture, removing combined water from the mixture and adding any oleaginous base needed to give the desired soap content in the grease, said hydrolyzed anhydride mixture being the result of hydrolyzing an alkenyl succinic anhydride of 8 to 39 carbon atoms with water in the presence of about 0.5 to 10% by weight of the anhydride of an acid having a dissociation constant of at least about $1 \times 10^{-5}$.

2. The process of claim 1 where the acid is acetic acid.

3. The process of claim 1 in which the water added in the hydrolyzing step weighs at least about 25% the weight of the anhydride.

4. The process of claim 3 where the acid is acetic acid, the combined water is removed at a temperature of about 310–340° F. and oleaginous base is added in a quantity sufficient to give the grease a soap content of about 7.5 to 25%.

5. The process of claim 1 where the hydrolysis takes place in the presence of 1–15% stearic acid based on the weight of the anhydride.

6. The process of claim 1 in which the calcium component is $Ca(OH)_2$.

7. The process of claim 1 in which the calcium component is lime.

8. A process for making grease containing a liquid oleaginous lubricating base and about 2.5 to 50% of a calcium alkenyl succinate as the essential thickening constituent which comprises neutralizing a hydrolyzed anhydride mixture at a temperature of up to about 130° F. by addition of a calcium component in the presence of an amount of water at least about equal to the weight of the anhydride and a quantity of oleaginous lubricating base at least about three times the weight of the anhydride, removing free water from the mixture, removing combined water from the mixture and adding any oleaginous base needed to give the desired soap content in the grease, said hydrolyzed anhydride mixture being the result of hydrolyzing an alkenyl succinic anhydride of 8 to 16 carbon atoms with water in the presence of about 0.5 to 10% by weight of the anhydride of an acid having a dissociation constant of at least about $1 \times 10^{-5}$.

9. The process of claim 8 where the acid is acetic acid.

10. The process of claim 8 in which the water added in the hydrolyzing step weighs at least about 25% the weight of the anhydride.

11. The process of claim 8 in which the anhydride has 16 carbon atoms.

12. The process of claim 11 in which the anhydride is tetrapropenyl succinic anhydride.

References Cited in the file of this patent

UNITED STATES PATENTS

| 2,528,373 | Knowles et al. | Oct. 31, 1950 |
| 2,698,298 | Giammaria | Dec. 28, 1954 |
| 2,868,729 | Nelson et al. | Jan. 13, 1959 |

OTHER REFERENCES

"Physical Organic Chemistry," Hine, McGraw-Hill, New York, 1956, pages 300 and 301.

"Unit Processes in Organic Synthesis," Groggins, McGraw-Hill, New York, 1958, pages 750 to 753.